(12) United States Patent
Wang et al.

(10) Patent No.: US 6,514,432 B1
(45) Date of Patent: Feb. 4, 2003

(54) CHEMICAL SYNTHESIS OF WATER-SOLUBLE, CHIRAL CONDUCTING-POLYMER COMPLEXES

(75) Inventors: Hsing-Lin Wang, Los Alamos, NM (US); Patrick A. McCarthy, Oakland, CA (US); Sze Cheng Yang, Wakefield, RI (US)

(73) Assignee: The Regents of the University of California, Los Alamos, NM (US)

( * ) Notice: Subject to any disclaimer, the term of this patent is extended or adjusted under 35 U.S.C. 154(b) by 57 days.

(21) Appl. No.: 09/872,560

(22) Filed: May 31, 2001

(51) Int. Cl.⁷ .................. C08G 73/00; C08G 73/02; C08G 75/00
(52) U.S. Cl. .................. 252/500; 524/800; 528/377; 528/378; 528/403; 528/417; 528/422; 528/423; 536/23.1
(58) Field of Search .............. 524/800; 528/377, 528/378, 403, 417, 422, 423; 252/50; 536/23,1

(56) References Cited

U.S. PATENT DOCUMENTS 6,010,645 A * 1/2000 Angelopoulos et al. ..... 252/500
6,018,018 A * 1/2000 Samuelson et al. ......... 528/422

OTHER PUBLICATIONS

"Chemical Synthesis of Optically Active Polyaniline in the Presence of Dextran Sulfate as Molecular Template", Yuan et al., Chemistry Letters (2002), 5, 544.*

* cited by examiner

Primary Examiner—Robert Dawson
Assistant Examiner—Marc S Zimmer
(74) Attorney, Agent, or Firm—Samuel M. Freund

(57) ABSTRACT

The template-guided synthesis of water-soluble, chiral conducting polymer complexes is described. Synthesis of water-soluble polyaniline complexes is achieved by carefully controlling the experimental parameters such as; acid concentration, ionic strength, monomer/template ratio, total reagent concentration, and order of reagent addition. Chiral (helical) polyaniline complexes can be synthesized by addition of a chiral inducing agent (chiral acid) prior to polymerization, and the polyaniline helix can be controlled by the addition of the (+) or (−) form of the chiral acid. Moreover the quantity of chiral acid and the salt content has a significant impact on the degree of chirality in the final polymer complexes. The polyaniline and the template have been found to be mixed at the molecular level which results in chiral complexes that are robust through repeated doping and dedoping cycles.

14 Claims, 9 Drawing Sheets

CHEMICAL SYNTHESIS OF WATER-SOLUBLE, CHIRAL CONDUCTING-POLYMER COMPLEXES

STATEMENT REGARDING FEDERAL RIGHTS

This invention was made with government support under Contract No. W-7405-ENG-36 awarded by the U. S. Department of Energy to The Regents of The University of California. The government has certain rights in the invention.

FIELD OF THE INVENTION

The present invention relates generally to water-soluble, chiral interpolymer complexes containing a conducting polymer and, more particularly, to a chemical method for synthesizing such chiral interpolymer complexes.

BACKGROUND OF THE INVENTION

Polyaniline has received increased interest for industrial applications (See, e.g., "Plastics that Conduct Electricity" by R. B. Kaner and A. G. MacDiaramid, *Scientific American* 258, 106 (1988)). Chiral conducting polymers are particularly interesting for industrial applications including surface-modified electrodes, chemical separation materials, self assembled monolayers, light emitting devices, light filters (Bragg filters), and liquid crystalline devices, to name a few examples. Chiral polyaniline has been generated. In "Chemical Generation Of Optically Active Polyaniline Via The Doping Of Emeraldine Base With Camphorsulfonic Acid" by M. R. Majidi, et. al., *Polymer* 36, 3597 (1995), it was disclosed that optically inactive polyaniline could be converted to optically active polyaniline by dissolving the emeraldine base form of polyaniline (EB) in n-methyl-2-pyrrolidinone and adding either (+)- or (-)-CSA. More recently, chiral polyaniline was electrochemically synthesized by polymerizing an aqueous solution of aniline in the presence of either (+)- or (-)-CSA (See e.g., "Facile Preparation Of Optically Active Polyanilines Via The In Situ Chemical Oxidative Polymerization Of Aniline" by I. D. Norris et. al., *Synthetic Metals* 106, 171 (1999)). The optically active polyanilines were found to be insoluble in common solvents and, consequently, difficult to process and difficult to purify.

U.S. Pat. No. 6,090,985 for "Chiral Polyanilines And The Synthesis Thereof" which issued to Alan G. MacDiarmid, et al. on Jul. 18, 2000 describes the chemical synthesis of chiral polyanilines which includes polymerizing an aniline monomer in the presence of a chiral dopant acid, an oxidizing agent and, optionally, a substrate. The products of this synthesis are not water-soluble. Furthermore, existing chiral materials are susceptible to loss of their optical activity. One might expect that if the chiral dopant is removed (by solution phase dedoping) the organized chiral conformation PAN will be susceptible to thermal randomization. Indeed, when a solid film of chiral emeraldine base is dissolved in organic solvents, the optical activity is lost (See, G. G. Wallace et al., *Macromolecules*, 33, 3237–3243 (2000)). Wallace et al. synthesized chiral polyaniline by dissolving both polyaniline emeraldine base and optically active camphorsulfonic acid in a common organic solvent, n-methyl-2-pyrrolidinone. The optical activity is also lost when a chiral PAN.CSA is heated to eliminate CSA (See, I. D. Norris et al., *Macromolecules* 31, 6529–6533 (1998)).

Water-soluble, chiral polyaniline nanocomposites have been synthesized by electrochemically polymerizing aniline in the presence of optically pure CSA and a dispersant, either polystyrene sulfonate or colloidal silica (See, e.g., "Electrochemical Formation Of Chiral Polyaniline Colloids Codoped With (+)- Or (-)-10-Camphorsulfonic Acid And Polystyrene Sulfonate" by J. N. Barisci et al., *Macromolecules*, 31, 6521 (1998); "Preparation of Chiral Conducting Polymer Colloids" by J. N. Barisci et al., *Synthetic Metals*, 84, 181 (1997); and "Electrochemical Preparation Of Chiral Polyaniline Nanocomposites" by V. Aboutanos et al., *Synthetic Metals*, 106, 89 (1999).). Also, a self-doped, water-soluble, chiral polyaniline has been synthesized by electrochemically polymerizing a 2-methoxyaniline-5-sulfonic acid monomer in the presence of (+) or (-) CSA (See "Optically Active Sulphonated Polyanilines" by E. V. Strounina et al., *Synthetic Metals*, 106, 129, (1999)). These water-soluble complexes were all synthesized electrochemically. Electrochemical synthesis (See, e.g., Wallace et al., supra) is considered by industrial standards to be small-scale syntheses and is not as promising as chemical synthesis for large-scale production.

Sun et al. and Liu et al. achieved the template-guided synthesis of water-soluble non-chiral polyaniline complexes by polymerizing an aniline monomer in the presence of a polyelectrolyte (See, e.g., L. Sun et. al., *American Chemical Society Polymer Preprints*, 33, 379 (1992), L. Sun et. al., *Materials Research Society, Society, Symposium Proceedings*, 328, 209 (1994); L. Sun et al., *Materials Research Society, Symposium Proceedings*, 328, 167 (1994); and R. J. Cushman et al., *Journal of Electroanalytical Chemistry*, 291, 335 (1986)). The final product is a double-stranded polymer complex in which the polyaniline and the template (polyelectrolyte) are bound by electrostatic interaction (See, e.g., L. Sun et al., *Synth. Metals* 84, 67 (1997) and U.S. Pat. No. 5,489,400 for "Molecular Complex Of Conductive Polymer And Polyelectrolyte; And A Process For Producing Same" which issued to J. M. Liu et al. on Feb. 06, 1996). Such polyaniline complexes are water soluble because of the hydrophilic nature of the polyelectrolyte. The above references teach that template-guided syntheses are carried out stepwise. First, the template (a pre-formed polymer) and the monomer of the conducting polymer to be prepared are assembled into an adduct, the acidity of the adduct solution is then adjusted, and the polymerization is initiated.

Interpolymer complex syntheses have advantages over existing water-soluble polyaniline syntheses. In U.S. Pat. No. 6,018,018 for "Enzymatic Template Polymerization" which issued to Lynne A. Samuelson et al. on Jan. 25, 2000, the enzymatic formation of polymers in the presence of a template is described wherein at least one physical property of the resulting polymer is affected. The method includes combining at least one redox monomer or, in some cases, a redox oligomer, with a template and an enzyme, such as horseradish peroxidase, to form a reaction mixture. The redox monomer or oligomer aligns along the template before or during the polymerization. The complex formed thereby can be electrically or optically active. Since enzymes are required, such syntheses are expensive and products therefrom are difficult to purify.

Accordingly, it is an object of the present invention to provide a method for chemically synthesizing water-soluble, chiral polyanilines without using electrochemistry, enzymes or chiral polymers.

Another object of the invention is to provide a method for chemically synthesizing water-soluble, chiral polyanilines that can be carried out on a large scale and the resulting product easily purified.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention and in accordance with its purposes, as embodied and broadly described herein, the template-guided method for chemical synthesis of water-soluble, chiral conducting-polymer complexes hereof includes contacting a conducting polymer monomer with a chosen water-soluble polymer, thereby forming an adduct; contacting the adduct with a chiral acid, polymerizing the monomer, whereby a water-soluble, interpolymer complex containing a chiral conducting polymer bound to the water-soluble polymer is formed.

It is preferred that the monomer is aniline.

Preferably, the chiral acid is camphorsulfonic acid.

Preferably also, the water-soluble polymer is poly(acrylic acid).

It is also preferred that the ratio of added monomer to the template polymer repeating unit is between 0.001 to 10.

Benefits and advantages of the present invention include the inexpensive, straightforward preparation of stable, water-soluble, chiral, conducting-polymer complexes which can be scaled to industrial quantities. Increased conformational stability will be advantageous for industrial applications including; surface coating or membrane for separation of optical isomers. The interpolymer complex of this invention also remains optically active after repeated doping and de-doping cycles.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 6a shows UV/VIS spectra for three successive doping and dedoping cycles for the chiral polyaniline, the spectra for the second and third cycles falling on top of one another, while

DETAILED DESCRIPTION

Figure 1:
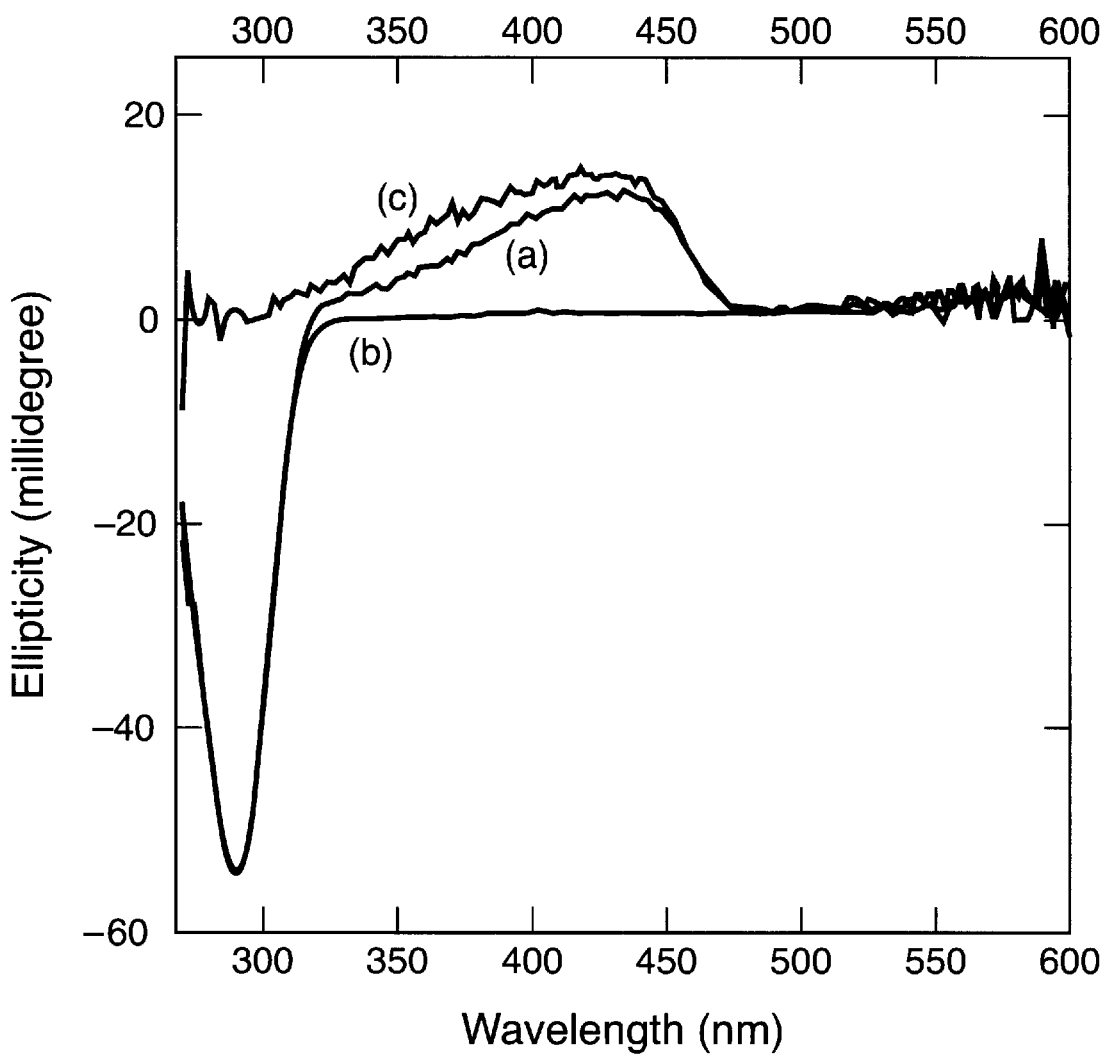
FIG. 1 shows circular dichroism (CD) spectrum of the as-synthesized reaction products from the synthesis described in Example 1 (curve a); curve b is the CD spectrum of pure CSA; and curve c is the CD spectrum of a synthesis where CSA is exhaustively purified by dialysis against 0.1M HCl.

Briefly, the present invention includes a template-guided synthetic approach for synthesizing water-soluble, chiral polyanilines and other chiral conducting polymers. Template-guided syntheses are carried out stepwise. In order for the reaction to result in a water-dispersible polymeric complex, these steps must be carried out in a particular sequence and with a particular timing. First, the template (a water-soluble neutral or polyelectrolyte polymer) and the monomer of the conducting polymer to be prepared are assembled into an adduct; a chiral acid is then added to the solution of the adduct; and the polymerization is initiated.

An adduct is a non-covalent assembly of monomers distributed along the backbone of a pre-formed polymer. The adduct of the present invention is assembled by diluting the pre-formed polymer to a desired concentration, adding a monomer, and stirring for 24 h. During this time, monomer binds to the polymer template. The driving forces for monomer binding can be electrostatic (via counter-ion condensation), hydrogen bonding, van der Waals, and/or other short range attractive forces. Once the adduct is assembled, the monomer is distributed along the backbone of the pre-formed polymer so that the adduct assembly resembles the polymeric complex product.

The adduct is next acidified using a chirality inducing acid to form the precursor adduct. The solution is stirred for several minutes. In some polymerizations (for example, aniline) additional acidification of the adduct is required.

The monomer is then polymerized to a polymer by the addition of an oxidant. The resulting product is called an interpolymer complex. The final product is believed by the present inventors to be a polymer complex where the newly formed polymer and the template are non-covalently bound by electrostatic, hydrogen bonding, and/or van der walls interactions.

The interpolymer complexes resulting from the template-guided synthesis using poly(acrylic acid) (PAA) as the water-soluble polymer and aniline as the monomer of the conducting polymer (polyaniline (PANI)), contain chiral, water-soluble polyaniline. The chirality within the polyaniline complex is robust; that is, the chirality was not able to be enhanced or diminished once the polymerization reaction was complete. The optical activity of the polyaniline was found to remain undiminished when the camphorsulfonic acid (CSA) used as the chiral acid was completely removed by exchange with HCl (non-chiral) during dialysis in aqueous solution. Additionally, doping and dedoping the chiral complex resulted in a shift in the absorption spectrum and corresponding circular dichroism (CD) spectrum. Repeated doping and dedoping of the complex showed little loss of CD intensity, however. Infrared spectra show that PAA/PANI complexes intimately interact at the molecular level. Increasing the (−)-CSA concentration prior to polymerization increases the chirality of the final polyaniline complex.

In the template-guided chiral synthesis of the present invention, the role of the chiral CSA is that of a chirality inducing catalyst. Once the catalyst is removed, the helical structure of PAN is stabilized by the non-chiral PAA. This conformational stability is to be contrasted with the relatively unstable dedoped, single-strand PAN.CSA where the chiral-inducing agent needs to remain intercalated to maintain the chirality of the PAN, unless it is dedoped in solid state under a temperature colder than the glass transition temperature of PAN. As stated, the optical activity of the PAA/PANI complex of the present invention remains unchanged after removal of the chirality inducing agent ((+)- or (−)-CSA).

Reference will now be made in detail to the present preferred embodiments of the invention which are illustrated in the following EXAMPLES and the accompanying drawings.

EXAMPLE 1

1. Synthesis of a Water Soluble Chiral Polyaniline Interpolymer Complex

In what follows, polyacrylic acid (90,000 MW, Polysciences), aniline (99.5%, Aldrich), and sodium persulfate (Aldrich) were used as received. Ultrapure water (resistivity>18 MΩ/cm) was used in all polymer complex solutions and in all membrane dialysis. The dialysis of the polyaniline complex solutions was carried out using the Spectra/Por dialysis membrane with the molecular weight cut off at ~3500 Dalton. UV-Vis spectra were obtained using a Hewlett Packard 8453 Spectrometer. Infrared spectra were obtained from pressed pellets on a Mattson, Galaxy series FTIR 5000 spectrometer. Circular Dichroism (CD) spectra were obtained using a Jasco 750 spectrometer having a scan rate of 200 nm/min. Samples were prepared by filling the quartz cell (2 mm path length) with the diluted PANI complexes in aqueous solution (0.2 ml of reaction products to 1 ml). The signal was averaged over five scans.

Aniline in the amount of 0.11 ml (0.0012 moles) was added to 5 ml de-ionized water containing 0.175 grams polyacrylic acid (0.0024 moles monomer unit, 90,000 MW). The solution was stirred for 24 h to ensure complete formation of the polyelectrolyte:aniline adduct, and 0.5 ml 3M (−)-CSA was added. The resulting solution was stirred for 10 min. after which 0.608 ml of 2M sodium persulfate (0.0012 mole) was added. The reaction mixture was stirred overnight. The final dark green solution contained no visual particles or precipitates. All CD spectra in this paper were measured by diluting 0.2 ml of the reaction product to 1.0 ml with deionized water.

Turning now to the Figures, curve (a) of FIG. 1 shows the CD spectrum of the unpurified interpolymer reaction product from EXAMPLE 1: pure (−)-CSA, and an interpolymer complex where racemic CSA was added in the place of optically active CSA. Curve a shows two peaks: a negative peak at 290 nm and a broad positive band between 310 and 400 nm. The negative peak at 290 nm is consistent with pure (−)-CSA (curve (b)). The broad positive band between 310 and 400 nm is consistent with polyaniline (See, e.g., M. R. Majidi et. al., *Polymer*, 36, 3597, (1995)).

Purification of the chiral complex was achieved by dialyzing against 0.1 M of HCl to remove PANI oligomer impurities, reaction by-products, and (−)-CSA. After purification, no (−)-CSA peak at 290 nm was observed. Curve (c) shows the CD spectrum of the synthesis product after dialysis. A broad positive band between approximately 310 and 460 nm having a maximum at about 440 nm is observed, showing that (−)-CSA can be completely removed and that the polyaniline remains chiral.

A racemic synthesis was carried out exactly the same as the chiral synthesis except racemic [(±)-CSA] was used in the place of (−)-CSA. This synthesis also resulted in a water-soluble complex; however, the complex was not optically active. Thus, the chiral acid is responsible for inducing chirality in the polyaniline interpolymer complex.

2. Characterization: Acid and Base Forms

Figure 2:
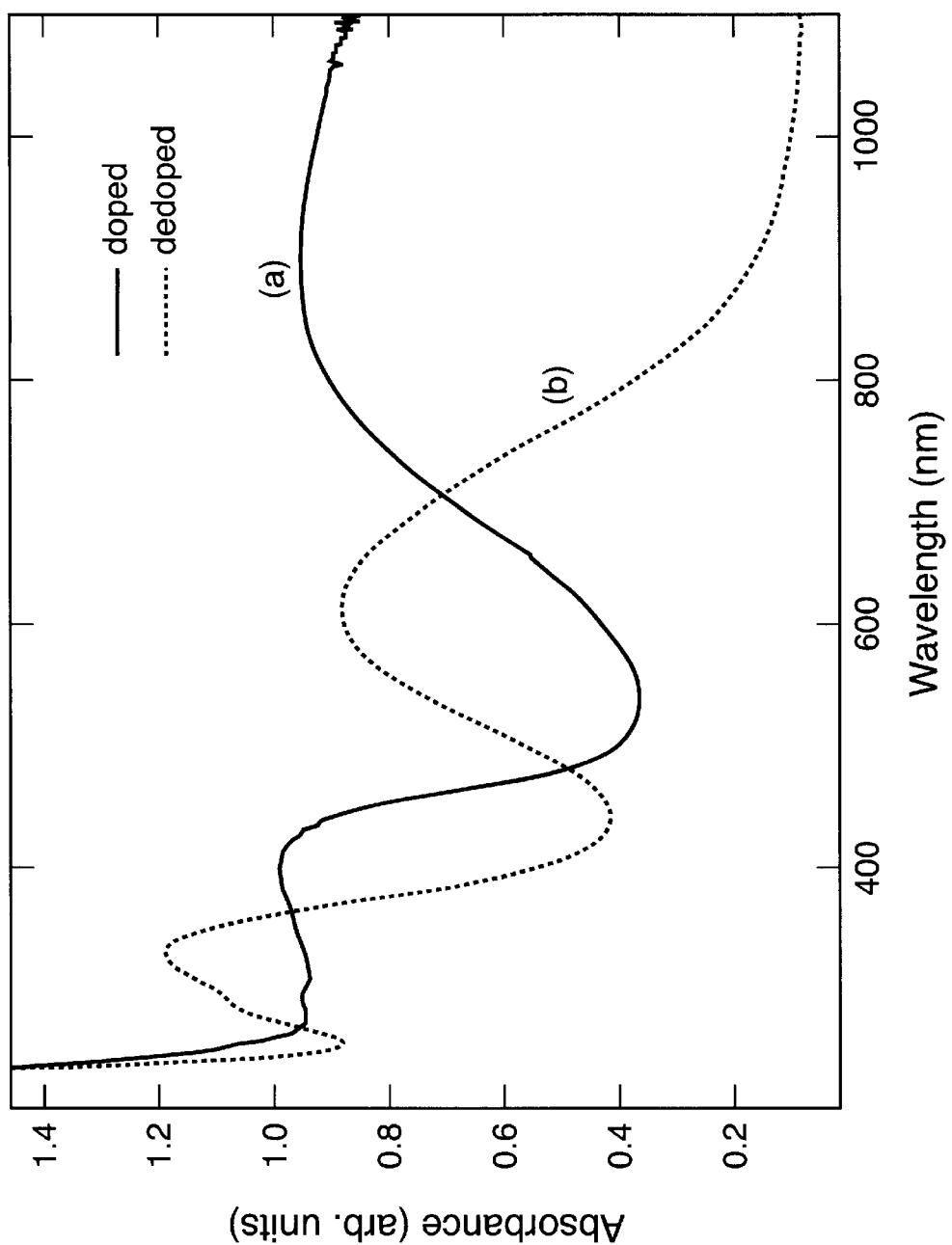
FIG. 2 shows a UV/VIS spectrum of the acid (doped) form of chiral inter-polymer complex (curve a), while curve b is a UV/VIS spectrum of the base (de-doped) form of chiral inter-polymer complex.

The acid and base forms of the water-soluble, chiral polyaniline complex (See Example 1) were characterized by UV/VIS spectroscopy. Polyaniline can exist in the emeraldine base form and the emeraldine salt form; both forms have distinct UV/VIS spectra. The UV-VIS spectrum of polyaniline in the emeraldine salt (doped) form has an absorbance maximum at 450 nm and a free-carrier "tail" extending beyond 1100 nm. The UV/VIS spectrum of polyaniline in the emeraldine base form has absorbance peak maxima at 330 nm and 610 nm. Curves (a) and (b) of FIG. 2 show the UV/VIS spectra of the water-soluble, chiral, polyaniline complex in the acid and base forms, respectively. These UV/VIS spectra are consistent with the UV/VIS spectra for pure polyaniline.

Figure 3:
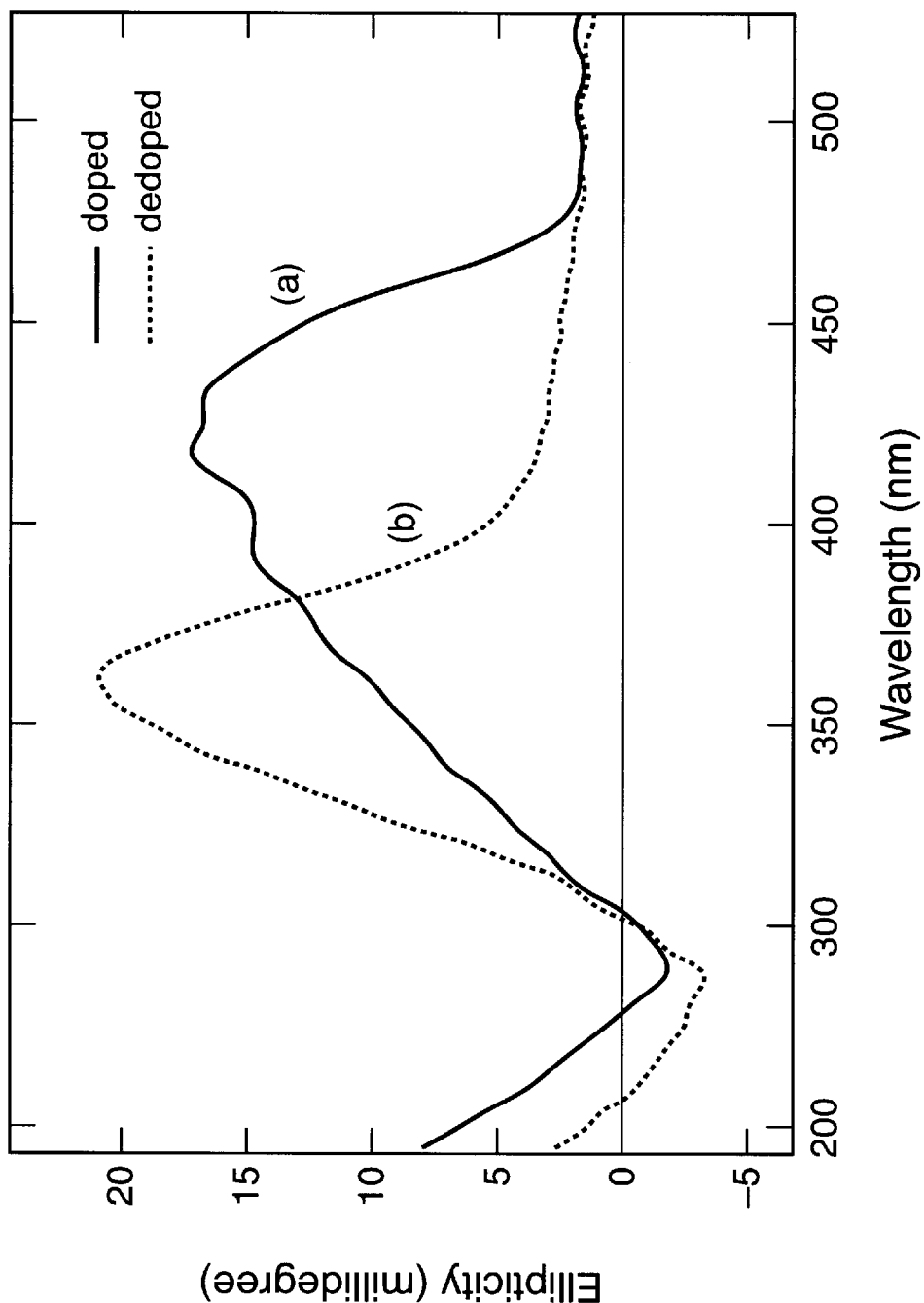
FIG. 3 shows a CD spectrum of the acid (doped) form of chiral interpolymer complex (curve a); while curve b is a CD spectrum of the base (de-doped) form of chiral inter-polymer complex.

FIG. 3 shows the acid and base forms of the water-soluble chiral polyaniline complex (Example 1) characterized by circular dichroism (CD) spectroscopy. In the doped form, the CD spectrum shows a broad, positive peak between 310 nm and 460 nm having a maximum at approximately 440 nm (curve (a)). After titration, the CD spectrum of the emeraldine base form shows that the broad band shifts and becomes narrower between 310 nm and 400 nm with a maximum at approximately 360 nm (curve (b)). The CD spectra are consistent with CD spectra for polyaniline set forth in the literature. Additionally, the shift in CD spectra of the polyaniline complex solution in the doped and dedoped forms corresponds to the shift observed in the UV-VIS spectra.

3. Characterization: IR

In order to further characterize the polyaniline complex prepared in accordance with Example 1, we measured the infrared (IR) spectrum of polyaniline in the emeraldine base form (PANI(EB)), PM, and the chiral PAA/PANI(EB) complex. Immediately following synthesis of the interpolymer complex, the polyaniline within the complex is in the emeraldine salt form. To measure the IR spectrum the emeraldine salt form is converted to the emeraldine base form by adding ammonium hydroxide. Excess small ions and salts are removed by dialyzing the solution with distilled water. The resulting solution was dried to a powder at 110° C. overnight. The IR spectrum was taken using the KBr method.

Figure 4:
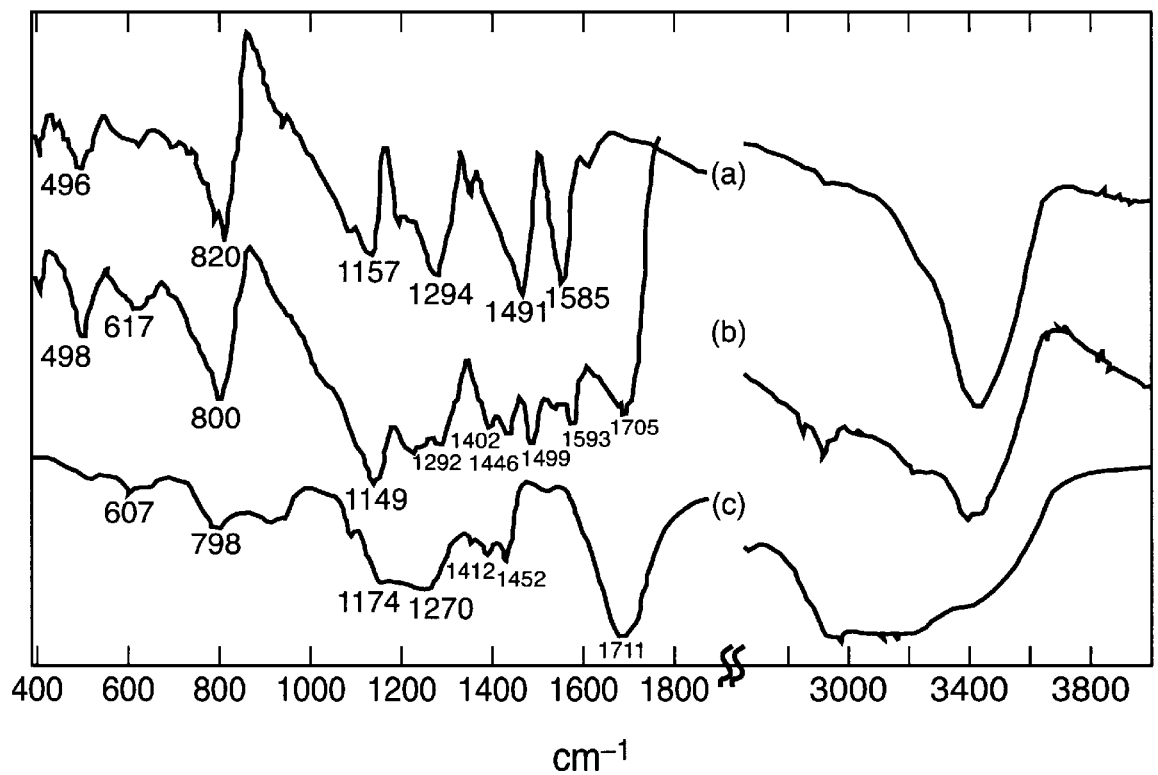
FIG. 4 shows the IR spectrum of PANI(EB) (curve a); curve b is an IR spectrum of PAA:PAN inter-polymer complex; and curve c is an IR spectrum of PAA.

FIG. 4 shows the IR spectrum of the PAA/PANI(EB) complex, PAA, and PANI(EB). The PAA/PANI(EB) complex (curve (b)) features a carbonyl stretching band at 1705 $cm^{-1}$, $CH_2$— bending at 1446 $cm^{-1}$, and C—O stretching bands coupled with O—H in-plane bending at 1402 and 1226 $cm^{-1}$. These bands are associated with, and only with, PAA. Meanwhile, other bands at 1593 and 1499 $cm^{-1}$ from the stretching of C=C of the aromatic ring, 1292 $cm^{-1}$ from C—N stretching, and 1149 $cm^{-1}$ from C—H bending are all associated with, and only with, polyaniline (emeraldine base). If the IR spectrum of the PAA/PANI(EB) complex is compared with the pure PAA (curve (c)) and PANI (curve (a)), it is seen that all bands have shifted from 5 to 20 $cm^{-1}$, which suggests changes of environment at the molecular level. In addition, a broad absorption feature from 3600 $cm^{-1}$ to 2300 $cm^{-1}$ due to strong intra- and interchain H-bonds is reduced in the PANI/PAA complex. IR spectroscopy shows the presence of both polyaniline and poly (acrylic acid) in the polymer complex. The shifting of the peak locations suggests there is interaction between the polymers at the molecular level.

4. Optimization: Chirality

It has been established that the presence of optically active CSA during the polymerization stage of a polyaniline complex synthesis results in an optically active polyaniline complex. The effect of varying the CSA concentration (prior to polymerization) on the intensity of the CD band corresponding to polyaniline within the polymer complex is investigated in what follows.

Figure 5:
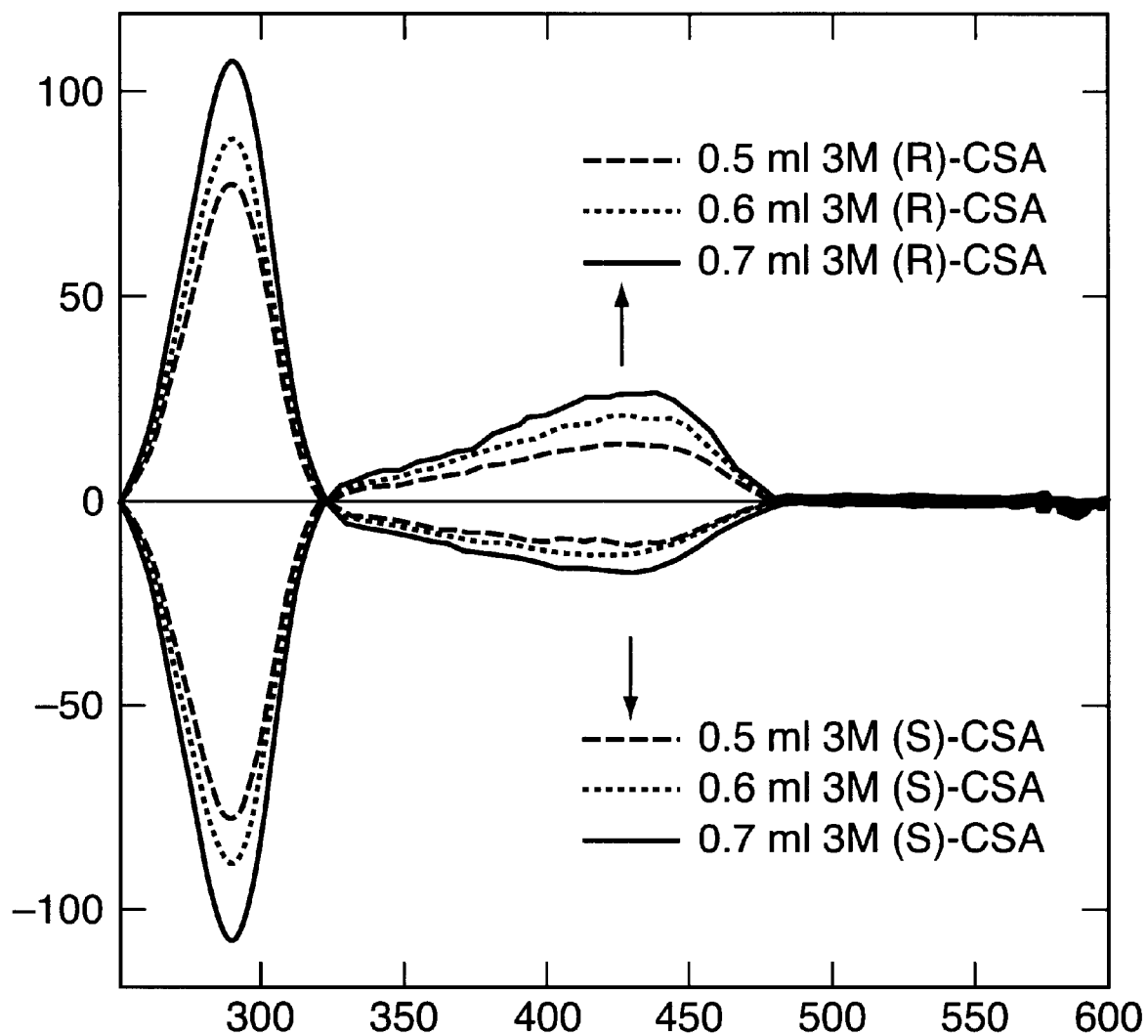
FIG. 5 shows the CD spectrum of the interpolymer complex resulting from a synthesis where 0.5 ml (−) or (+)-CSA was added (dashed line); the dotted line is a CD spectrum of the interpolymer complex resulting from a synthesis where 0.6 ml (−) or (+)-CSA was added; and the solid line is a CD spectrum of the interpolymer complex resulting from a synthesis where 0.7 ml (−)-CSA or (+)-CSA [(R)-CSA or (S)-CSA, respectively] was added.

Polyaniline complexes with various (−)-CSA concentrations were synthesized with the remainder of the experimental parameters being held constant. The quantity of optically active CSA added in the precursor adduct stage was increased in steps from 0.5 ml to 0.6 ml to 0.7 ml. FIG. 5 shows CD spectra for the 3 polyaniline complexes. It can be seen that the intensity of the polyaniline peak increases with increasing (−)-CSA concentration. Since the final concentration of polyaniline in each reaction is approximately the same, the concentration of chiral polyaniline must be greater when more optically active CSA is added.

It is important to note that formation of water-soluble polyaniline complexes with long-term stability (polyaniline does not precipitate out of the solution) requires careful control of experimental parameters such as the total amount of acid, overall concentration, monomer/oxidant ratio, and ionic strength. For example, adding too much (−)-CSA to the reaction mixture was found to result in the precipitation of the polyaniline complex from the solution.

5. Stability: Chirality

Figure 6A:
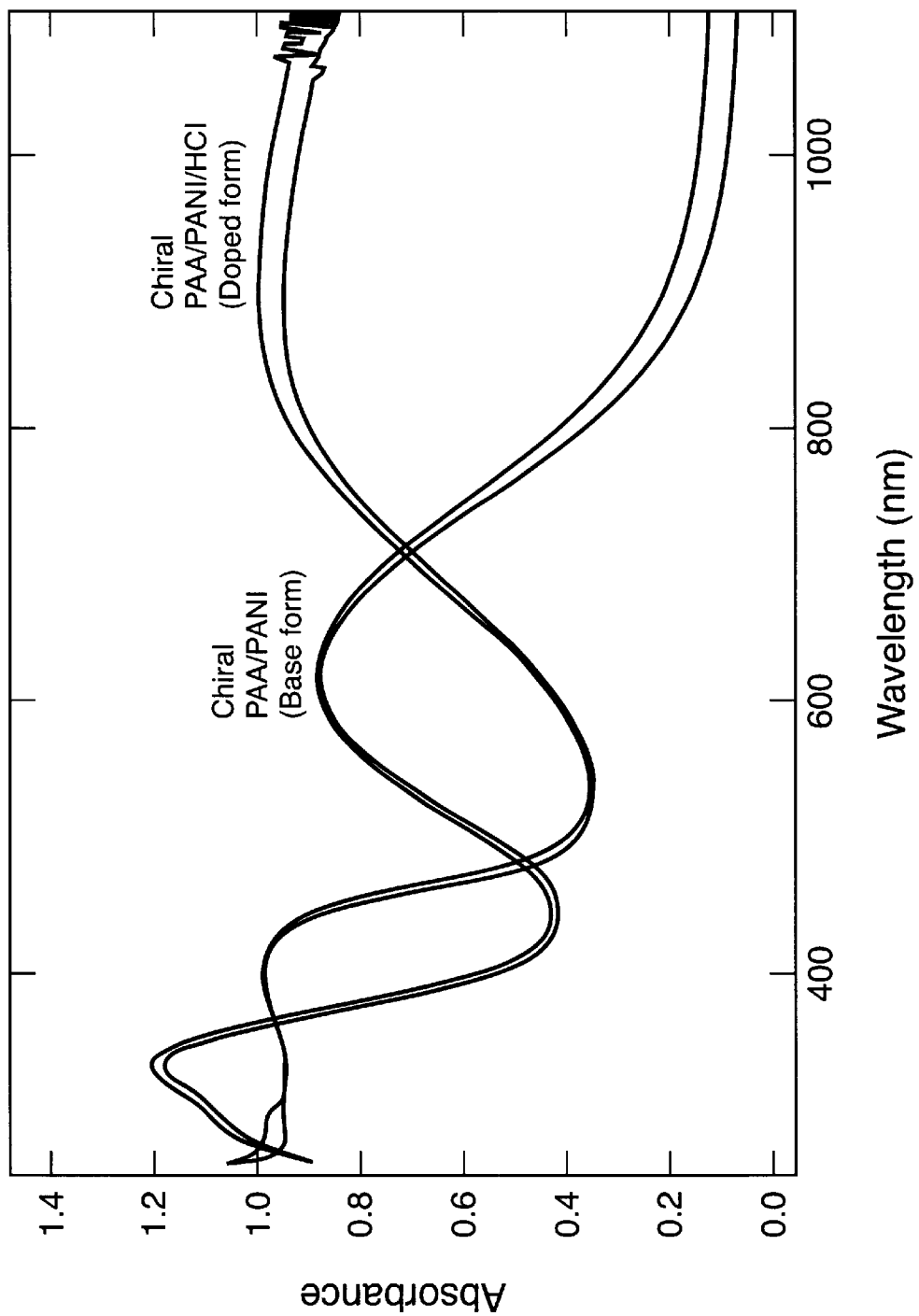

Polyaniline may be reversibly converted from the doped form (green) to the base form (blue) by addition of ammonium hydroxide (or some other base) or HCl (or some other acid), respectively. To test the stability of the polyaniline complex, the complex was repeatedly doped and redoped by titrating with HCl and ammonium hydroxide, respectively. FIG. 6a shows the UV-VIS spectra after doping and dedoping the solution three times. No change in the UV spectra was observed as a result of this cycling.

Figure 6B:
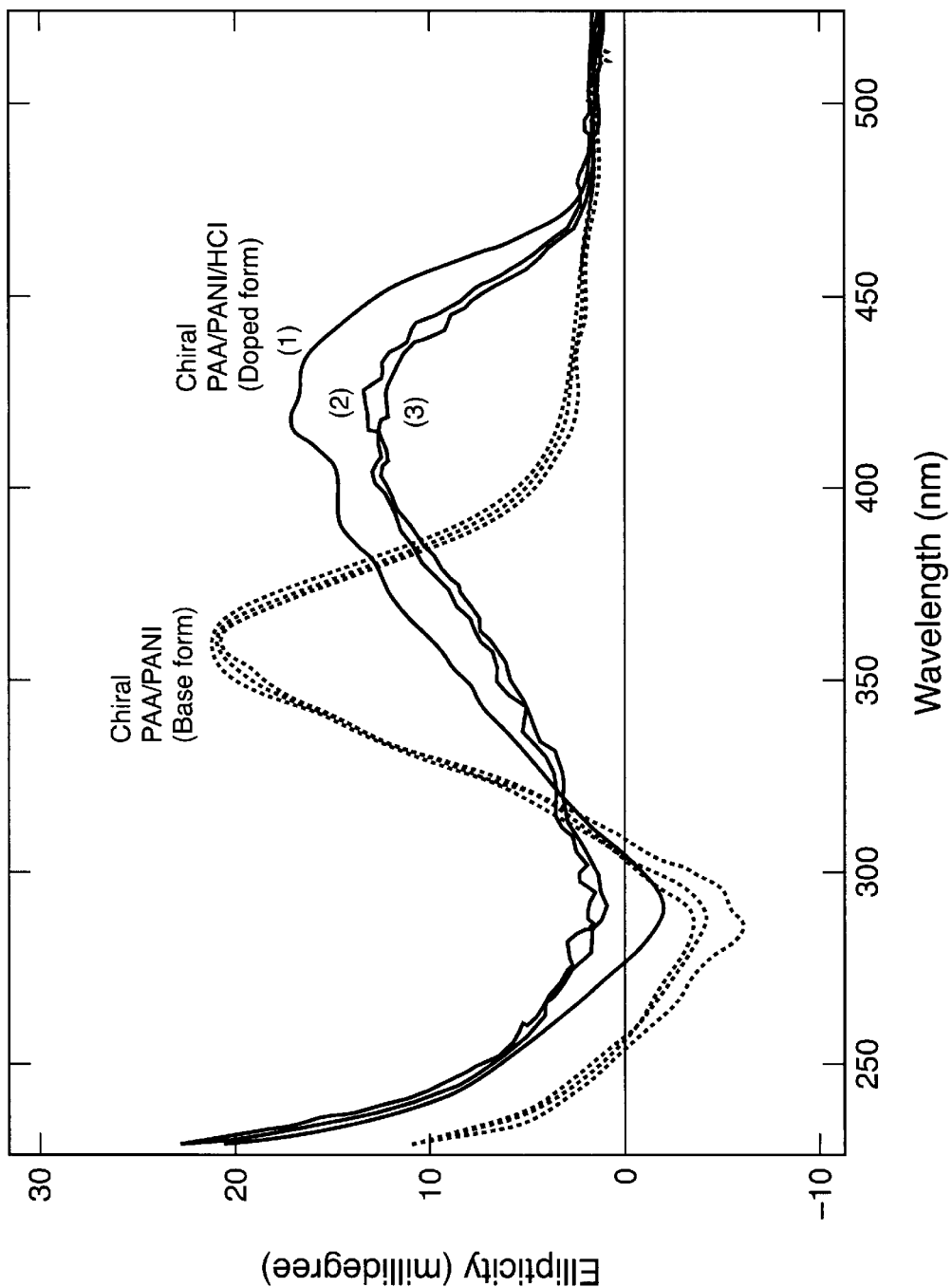
FIG. 6b shows the CD spectra therefor.

To investigate the stability of the chirality within the polyaniline the CD intensity of the salt and base forms was measured for three doping-dedoping cycles. Doping and dedoping was again achieved by titrating with either ammonium hydroxide or HCl. The CD spectrum of the doped form showed a broad, positive peak at 440 nm (FIG. 6b) and after titration to base form, this broad feature shifted and became a narrow peak at 360 nm. The shift in CD spectra of the polyaniline complex solution in the doped and dedoped forms corresponds to the shift seen in the UV-VIS spectra. Following the first redoping cycle, there was a slight decrease in the intensity of CD spectra. However, the CD intensity for subsequent doping-dedoping cycles remained constant. These results suggest that the conformation of the polyaniline complex in solution is stable and its chirality remains despite more than three doping-dedoping cycles.

EXAMPLE 2

To 0.11 ml of aniline (0.0012 moles), 5 ml de-ionized water containing 0.175 grams poly(acrylic acid) (0.0024 moles monomer unit, 90,000 MW) was added. The solution was stirred for 24 h to ensure complete formation of the adduct after which 0.5 ml of 3M (+)-CSA was added. The solution was stirred for 10 min. before 0.608 ml of 2M sodium persulfate (0.0012 mole) was added. The reaction mixture was stirred overnight. The final dark green solution contained no visual particles or precipitates.

Previous electrochemical syntheses of chiral polyaniline have shown that both enantioselective polyanilines can be synthesized by adding either (−) or (+)-CSA. The CD spectrum of a product synthesized in the presence of (−)-CSA is the mirror image of the synthesis product synthesized in the presence of (+)-CSA. The effect of synthesizing the polyaniline complex in the presence of (+)-CSA instead of (−)-CSA was next investigated. The synthesis procedures outlined for Example 1 hereinabove were followed except that 0.5 ml (+)-CSA was added instead of adding 0.5 ml (−)-CSA.

FIG. 5 (spectra with least intensity) shows the CD spectra of synthesis products where 0.5 ml of (+)-CSA was added. It can be seen that a polyaniline complex synthesized using (−)-CSA results in a complex containing polyaniline with a positive band at approximately 440 nm and the polyaniline complex synthesized using (+)-CSA results in a complex containing polyaniline with a negative band at approximately 440 nm. This strong mirror image shows that the template-guided chemical synthesis of chiral polyaniline complexes of the present invention is enantioselective. That is, either optically active forms of double-strand polyaniline can be synthesized by addition of either (−)-CSA or (+)-CSA.

EXAMPLE 3

Figure 7:
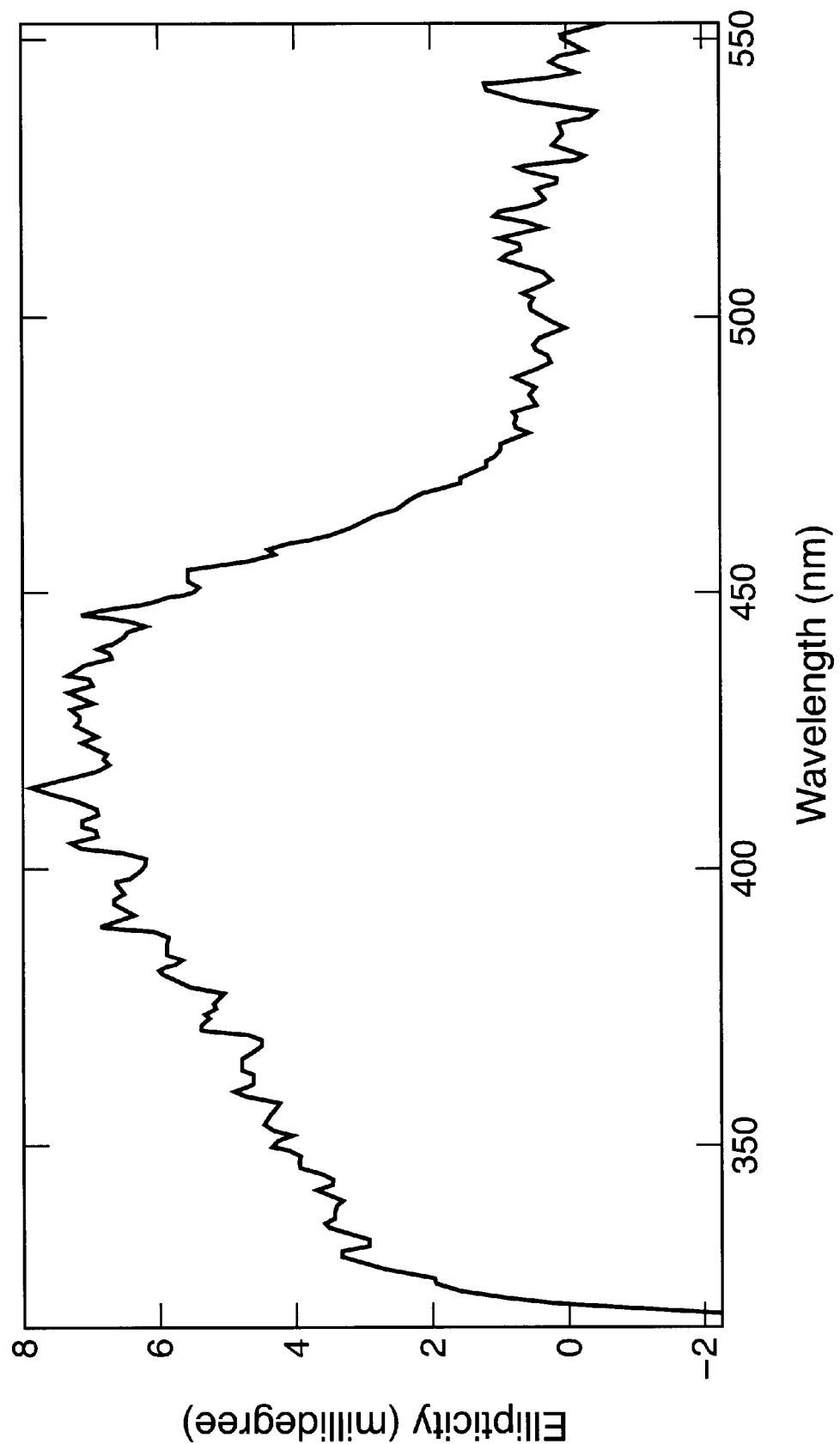
FIG. 7 is a CD spectrum of PAN:PVP(−)-CSA reaction product from the synthesis described in Example 3.

To 0.082 ml of aniline was added 5 ml de-ionized water containing 0.20 grams polyvinylpyrrolidone (Scientific Polymer Products, Inc., 350,000 MW, 0.0018 mole monomer unit). The solution was stirred for 24 h to ensure complete formation of the adduct after which 0.7 ml of 3M (−)-CSA (Aldrich, 0.0012 mole) was added. The solution was then stirred for 10 min. before 0.450 ml of 2M sodium persulfate (0.0009 mole) was added. The reaction mixture was stirred overnight. The final dark green solution contained no visual particles or precipitates. FIG. 7 shows the CD spectrum of the reaction product from Example 3.

EXAMPLE 4

To 0.082 ml. of aniline was added 5 ml de-ionized water containing 0.20 grams polyvinylpyrrolidone (Scientific Polymer Products, Inc., 350,000 MW, 0.0018 mole monomer unit). The solution was stirred for 24 h to ensure complete formation of the adduct after which 0.7 ml of 3M (+)-CSA (Aldrich, 0.0012 mole) was added. The solution was then stirred for 10 min. after which 0.450 ml of 2M sodium persulfate (0.0009 mole) was added. The reaction mixture was stirred overnight. The final dark green solution contained no visual particles or precipitates. The CD spectrum of the resulting reaction product from Example 4 was found to be the mirror image of that for FIG. 7.

EXAMPLE 5

Figure 8:
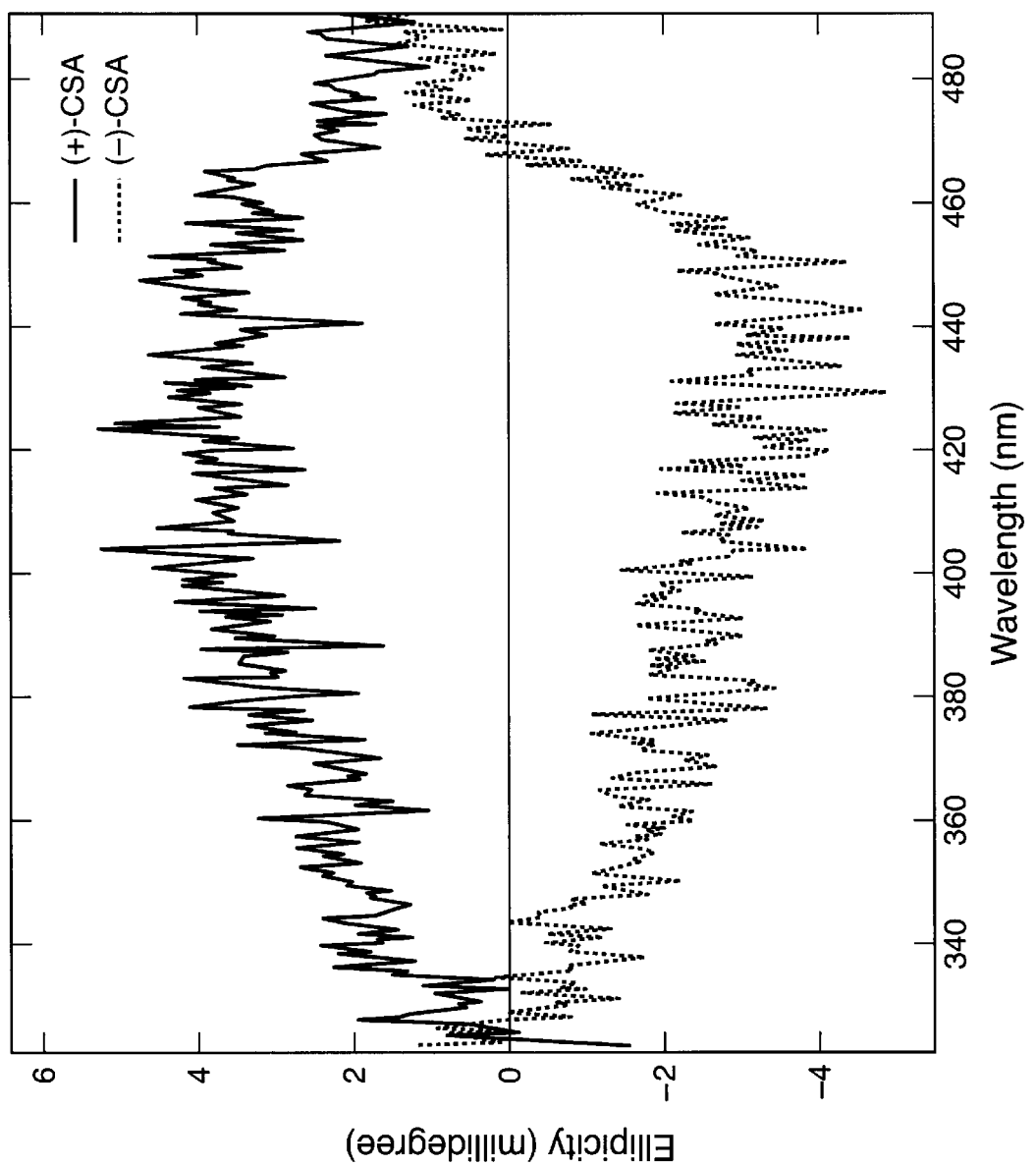
FIG. 8 is a CD spectrum of the reaction product from the synthesis described in Example 5.

To 0.026 ml of aniline was added 5 ml de-ionized water containing 0.2 grams hydroxyethyl cellulose. The solution was stirred for 24 h to ensure complete formation of the adduct after which 0.3 ml of 3M (+)-CSA was added. The solution was then stirred for 10 min. before 0.135 ml of 2M sodium persulfate was added. The reaction mixture was stirred overnight. The final dark green solution contained no visual particles or precipitates. The solid line in FIG. 8 shows CD spectrum of the reaction product from Example 5.

EXAMPLE 6

To 0.026 ml of aniline was added 5 ml de-ionized water containing 0.2 grams hydroxyethyl cellulose. The solution was stirred for 24 h to ensure complete formation of the adduct after which 0.3 ml of 3M (−)-CSA was added. The solution was stirred for 10 min. before 0.135 ml of 2M sodium persulfate was added. The reaction mixture was stirred overnight. The final dark green solution contained no visual particles or precipitates. The dotted line in FIG. 8 shows the CD spectrum of the reaction product from Example 6.

EXAMPLE 7

To 0.063 ml of pyrrole was added 5 ml de-ionized water containing 0.2 polyvinylpyrrolidone (Scientific Polymer Products, Inc., 350,000 MW, 0.0018 mole monomer unit). The solution was stirred for 24 h to ensure complete formation of the adduct after which 0.6 ml of 3M (L)-tartaric acid was added. The solution was stirred for 10 min. before 0.450 ml 2M sodium persulfate was added. The reaction mixture was stirred overnight. The final dark green solution contained no visual particles or precipitates. A chiral solution was observed.

EXAMPLE 8

To 0.063 ml of pyrrole was added 5 ml de-ionized water containing 0.2 polyvinylpyrrolidone (Scientific Polymer Products, Inc., 350,000 MW, 0.0018 mole monomer unit). The solution was stirred for 24 h to ensure complete formation of the adduct after which 0.6 ml of 3M (D)-tartaric acid was added. The solution was stirred for 10 min. before 0.450 ml of 2M sodium persulfate was added. The reaction mixture was stirred overnight. The final dark green solution contained no visual particles or precipitates. A chiral solution was observed.

The foregoing description of the invention has been presented for purposes of illustration and description and is not intended to be exhaustive or to limit the invention to the precise form disclosed, and obviously many modifications and variations are possible in light of the above teaching.

For example, other suitable water-soluble templates (water-soluble polymers) are: neutral, water-soluble polymers including, but not limited to, polyacrylamide, polyvinyl alcohol, etc.; polyelectrolytes including, but not limited to, polystyrene sulphonic acid, polyvinylsulphonic acid, etc.; biopolymers including, but not limited to, polyethylcellulose, proteins, DNA, RNA, polysaccharides, etc.; and inorganic polymers including, but not limited to, polyphosphates. Further, other suitable monomers are: conducting polymer monomers and their derivatives including, but not limited to, thiophene, phenylene, acetylene, etc. which polymerize to yield polythiophene, polyphenylene, polyacetylene etc. and derivatives thereof. Additionally, other suitable oxidants are, but are not limited to, ammonium persulfate, hydrogen peroxide, ferric chloride, and cerium chloride.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing a water-soluble, chiral conducting polymer complex which comprises the steps of:

(a) adding a monomer of the conducting polymer to a solution of a water-soluble polymer such that a water-soluble adduct is formed;

(b) adding a chiral compound to the solution of the soluble adduct; and (c) polymerizing the monomer, whereby a chiral interpolymer complex is formed.

2. The method as described in claim 1, wherein the water-soluble polymer comprises a neutral water-soluble polymer.

3. The method as described in claim 2, wherein the neutral water-soluble polymer is selected from the group consisting of polyvinylpyrrolidone, polyacrylamide, polyvinyl alcohol.

4. The method as described in claim 1, wherein the water-soluble polymer comprises a polyelectrolyte.

5. The method as described in claim 4, wherein the polyelectrolyte is selected from the group consisting of polyacrylic acid, polystyrene sulphonic acid, and polyvinylsulphonic acid.

6. The method as described in claim 1, wherein the water-soluble polymer comprises biopolymers.

7. The method as described in claim 6, wherein the biopolymers are selected from the group consisting of hydroxyethyl cellulose, proteins, DNA, RNA, and polysaccharides.

8. The method as described in claim 1, wherein the water-soluble polymer comprises inorganic polymers.

9. The method as described in claim 8, wherein the inorganic polymers comprise polyphosphates.

10. The method as described in claim 1, wherein the monomers comprise conducting polymer monomers and derivatives thereof.

11. The method as described in claim 10, wherein the monomers are selected from the group consisting of aniline, pyrrole, thiophene, phenylene, acetylene, etc. which polymerize to yield polythiophene, polyphenylene, and polyacetylene and derivatives thereof.

12. The method as described in claim 1, wherein the chiral compound comprises a chiral acid.

13. The method as described in claim 12, wherein the chiral acid is selected from the group consisting of (±)-CSA, D-tartaric acid and L-tartaric acid.

14. The method as described in claim 1, wherein said step of polymerization is performed by adding an oxidant to the solution selected from the group consisting of sodium persulfate, ammonium persulfate, hydrogen peroxide, ferric chloride, and cerium chloride.

* * * * *